US008657925B2

(12) United States Patent
Laslo

(10) Patent No.: US 8,657,925 B2
(45) Date of Patent: Feb. 25, 2014

(54) METHOD FOR FLUE GAS SCRUBBING

(71) Applicant: ALSTOM Technology Ltd., Baden (CH)

(72) Inventor: Dennis James Laslo, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/790,400

(22) Filed: Mar. 8, 2013

(65) Prior Publication Data

US 2013/0189171 A1    Jul. 25, 2013

Related U.S. Application Data

(62) Division of application No. 12/545,354, filed on Aug. 21, 2009, now Pat. No. 8,440,006.

(51) Int. Cl.
*B01D 47/00* (2006.01)
*B01D 53/14* (2006.01)

(52) U.S. Cl.
USPC .......... 95/235; 95/236; 96/235; 96/273; 96/322; 261/121.1; 261/126; 423/225; 423/232; 423/243.08; 423/243.11

(58) Field of Classification Search
None
See application file for complete search history.

(56) References Cited

U.S. PATENT DOCUMENTS

| 4,986,966 | A | 1/1991 | Lehto |
| 5,540,760 | A | 7/1996 | Risse et al. |
| 5,824,141 | A | 10/1998 | Gohara et al. |
| 5,928,615 | A | 7/1999 | Strock et al. |
| 6,190,620 | B1 | 2/2001 | Shinoda et al. |
| 7,635,455 | B2 | 12/2009 | Moser et al. |
| 2006/0185320 | A1 | 8/2006 | Dureiko et al. |
| 2010/0294386 | A1 | 11/2010 | Brogaard et al. |

FOREIGN PATENT DOCUMENTS

| EP | 0162536 A1 | 11/1985 |
| EP | 0652039 A1 | 5/1995 |
| EP | 2087933 A1 | 8/2009 |
| JP | 62-1440 | 1/1987 |
| JP | 8000949 | 1/1996 |
| JP | 11-128671 | 5/1999 |
| JP | 11-207145 | 8/1999 |
| JP | 11-290646 | 10/1999 |
| JP | 2009-172541 | 8/2009 |

*Primary Examiner* — Duane Smith
*Assistant Examiner* — Pankti Patel
(74) *Attorney, Agent, or Firm* — Rita D. Vacca

(57) ABSTRACT

A method of scrubbing flue gas includes introducing flue gas comprising an acidic gas through an inlet into a tower; spraying an acid-absorptive fluid into the tower such that the acid-absorptive fluid contacts the flue gas; accumulating the acid-absorptive fluid in a recycle tank portion of the tower; and introducing an oxygen-containing gas into the acid-absorptive fluid in the recycle tank portion of the tower, wherein the oxygen-containing gas is introduced through at least one opening of an aerator, each of the at least one openings are positioned to release the oxygen-containing gas at least at a distance greater than or equal to a predetermined radial distance from the flue gas inlet, the predetermined radial distance being equal to at least 10% of a diameter of the recycle tank portion of the tower.

6 Claims, 3 Drawing Sheets

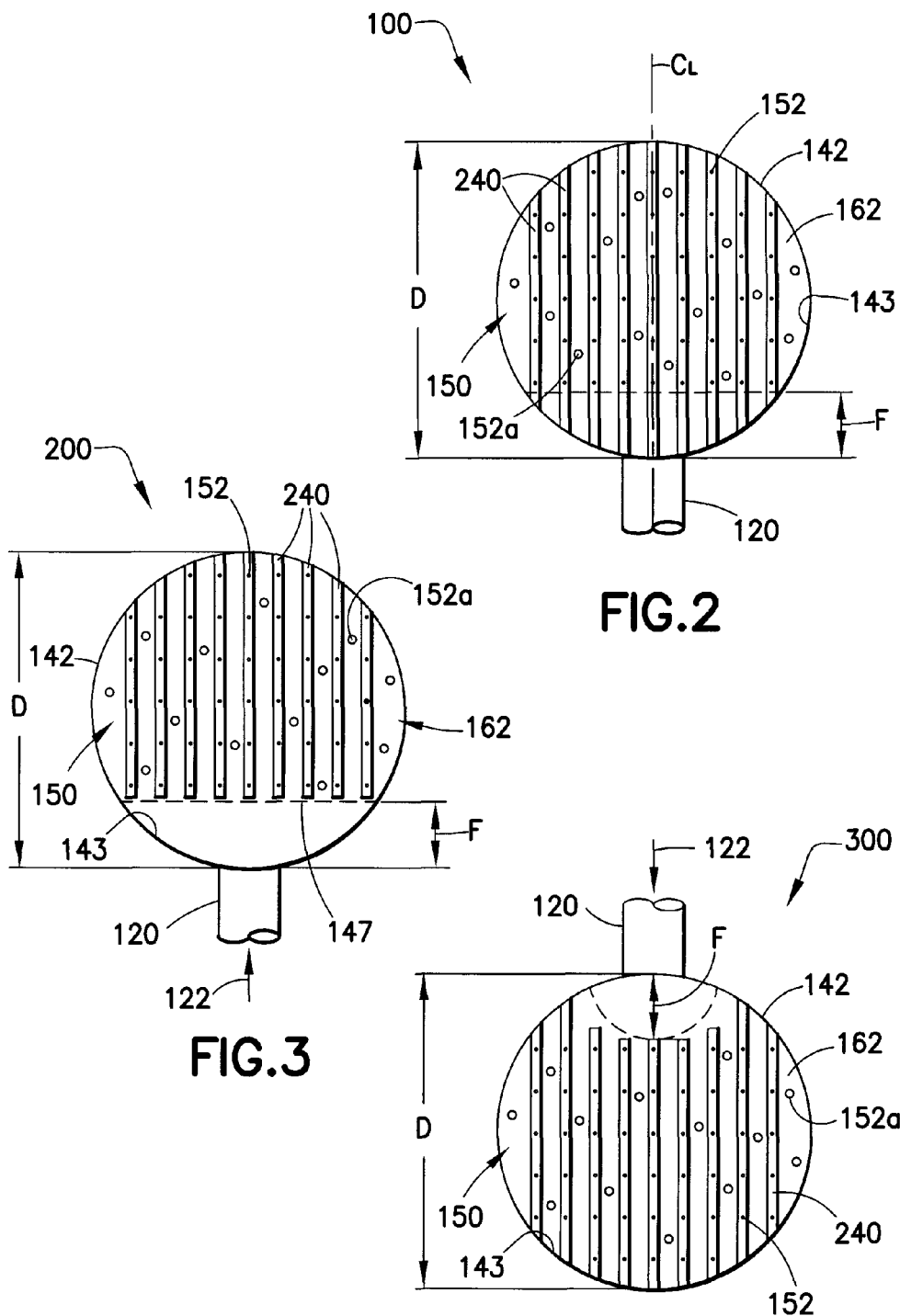

METHOD FOR FLUE GAS SCRUBBING

CROSS REFERENCE TO RELATED APPLICATION

This application is a divisional application of and claims priority benefit under 35 U.S.C. §120 to U.S. patent application Ser. No. 12/545,354, entitled System and Method for Flue Gas Scrubbing," filed Aug. 21, 2009, which is hereby incorporated by reference in its entirety.

FIELD

The disclosed subject matter relates to flue gas scrubbing apparatus that use an alkaline fluid to remove acidic gases from utility and industrial combustion gases (i.e., flue gases), and in particular it relates to flue gas scrubbing apparatus that are equipped to aerate the alkaline fluid.

BACKGROUND

Flue gases produced by combustion of fossil fuels and various other industrial operations in utility and industrial plants often contain sulfur dioxide ($SO_2$) that coverts to sulfuric acid and other acidic gases. Such gases are known to be hazardous to the environment and their emission into the atmosphere is closely regulated. These acidic gases can be removed from the flue gases through a wet flue gas desulfurization (FGD) process in a gas-liquid contactor, i.e., a flue gas scrubbing apparatus, in which the flue gas is contacted with a slurry fluid that can absorb the $SO_2$ and $SO_3$. One type of gas-liquid contactor utilizes a spray tower (hereinafter a "tower") in which flue gases are flowed upwardly through a descending shower of the slurry fluid. This slurry fluid typically comprises limestone ($CaCO_3$) or other materials. The calcium-based slurry reacts with $SO_2$, $SO_3$ to create calcium sulfite ($CaSO_3$) and calcium sulfate ($CaSO_4$). Calcium sulfate is used in various building materials. Calcium sulfite is a waste material. By injecting air in sufficient quantities, the calcium sulfite reacts with the oxygen in the air to form usable calcium sulfate.

Air and oxygen are usually added in a pool of slurry material at the base of the tower. The released air/oxygen cause the slurry fluid to foam and expand into a flue duct inlet into the tower causing complications.

To prevent this, the portion of the tower holding the slurry fluid is built larger to accommodate the expanded slurry material causing them to become more expensive.

Currently there is a need for an efficient low-cost tower design.

SUMMARY

According to aspects disclosed herein, there is provided a system for scrubbing flue gas, the system including: a tower having an inlet receiving a flow of flue gas and a recycle tank portion; a fluid disposed in the recycle tank portion; and an aerator having at least one opening for introduction of an oxygen-containing gas into the fluid, wherein the at least one opening is positioned to release the oxygen-containing gas at least at a distance greater than or equal to a predetermined radial distance from the inlet, the predetermined radial distance being equal to at least 10% of a diameter of the recycle tank portion.

According to other aspects illustrated herein, there is provided a method of scrubbing flue gas including: introducing flue gas comprising an acidic gas through an inlet into a tower; spraying an acid-absorptive fluid into the tower such that the acid-absorptive fluid contacts the flue gas; accumulating the acid-absorptive fluid in a recycle tank portion of the tower; and introducing an oxygen-containing gas into the acid-absorptive fluid in the recycle tank portion of the tower, wherein the oxygen-containing gas is introduced through at least one opening of an aerator, each of the at least one openings are positioned to release the oxygen-containing gas at least at a distance greater than or equal to a predetermined radial distance from the flue gas inlet, the predetermined radial distance being equal to at least 10% of a diameter of the recycle tank portion of the tower.

The above described and other features are illustrated by the following figures and detailed description.

BRIEF DESCRIPTION OF THE DRAWINGS

Referring now to the figures, which are exemplary embodiments, and wherein the like elements are numbered alike:

FIG. 2 is a schematic cross-sectional view of the tank, inlet and aerator of the apparatus of FIG. 1 taken along line A-A.

FIG. 3 is a schematic cross-sectional view of another embodiment along line A-A of the tank, inlet, and aerator of the apparatus of FIG. 1.

FIG. 3a is a schematic cross-sectional view of another embodiment along line A-A of the tank in FIG. 1.

DETAILED DESCRIPTION

Figure 1:
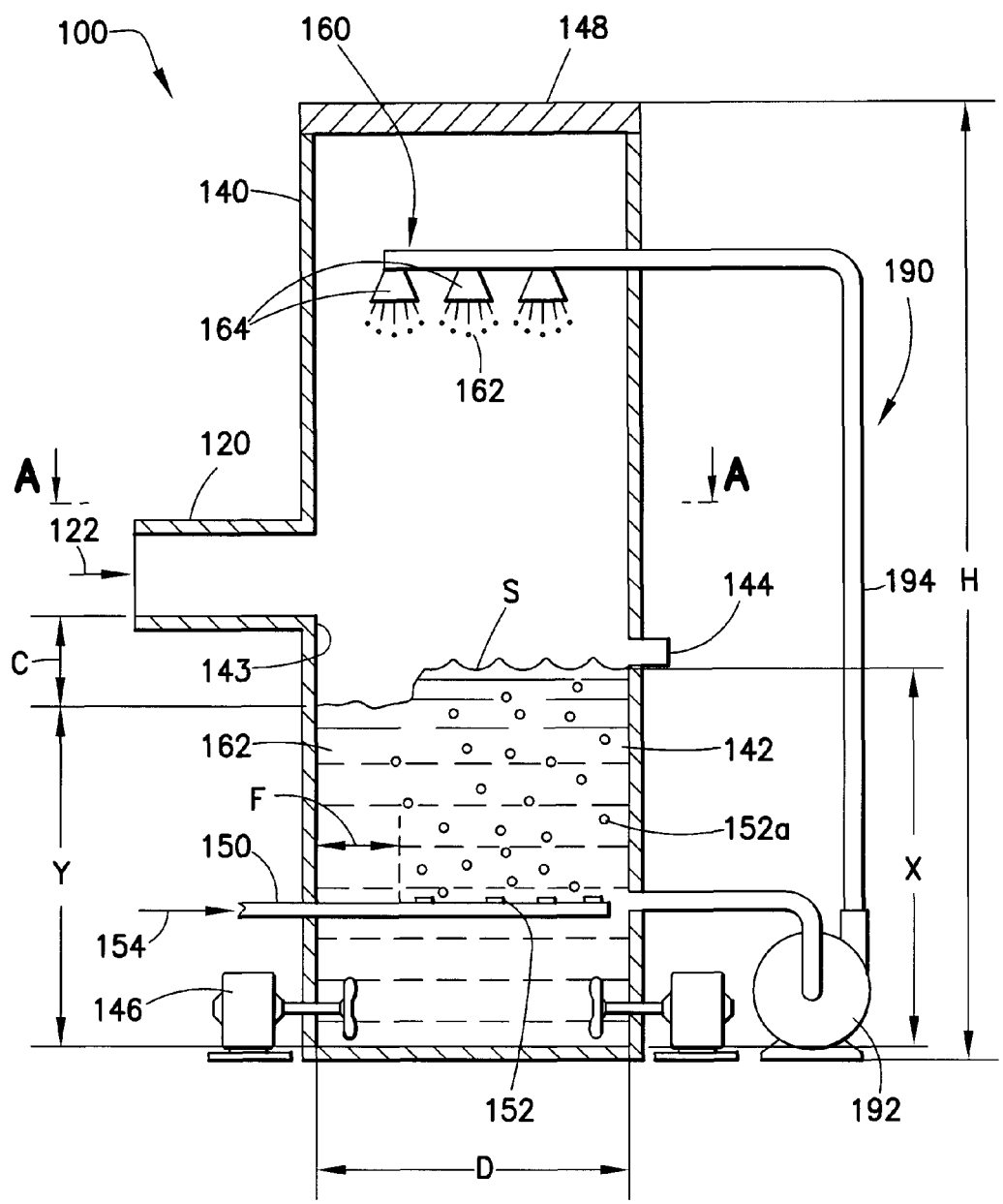
FIG. 1 shows in schematic cross-section a flue gas scrubbing apparatus in accordance with a one embodiment disclosed herein.

In one embodiment, as shown in FIG. 1, a flue gas scrubbing apparatus 100 includes an inlet 120 through which a flue gas 122 flows into a tower 140. As shown in FIG. 1, the inlet 120 is vertically aligned with an interior wall 143 of the tower 140, i.e., from a top-down view, there is no horizontal separation between the inlet 120 and the interior wall of the tank 140.

The inlet 120 can be formed from a corrosion resistant alloy, as may be other sections of the tower 140. In one embodiment, the corrosion resistant alloy is a high nickel alloy, but the apparatus is not limited in this regard, and in other embodiments, corrosion resistance may be achieved through the use of other materials, or a combination of high nickel alloy with other material.

In the tower 140, above the inlet 120, is a fluid injector 160 that introduces a spray of acid-absorptive fluid 162 into the tower 140. The flue gas 122 enters the tower 140 and rises upward as the fluid injector 160 emits a spray of the acid-absorptive fluid 162. In one embodiment, the fluid injector 160 includes a plurality of spray heads 164, and each spray head 164 emits a spray of the acid-absorptive fluid 162. However, the apparatus is not limited in this regard, and in other embodiments, other forms of fluid injector may be employed.

The flow of the flue gas 122 comes into contact with the sprayed acid-absorptive fluid 162 in the tower 140 such that acidic gas present in the flue gas, such as sulfur dioxide, hydrogen chloride (HCl) and/or hydrogen fluoride (HF) or the like, is absorbed by the acid-absorptive fluid. In this way, the flue gas is "scrubbed" by the acid-absorptive fluid 162.

In one embodiment, the acid-absorptive fluid 162 includes a calcium-based alkaline slurry, which may range in content from primarily liquid to a moist solid. One example of a calcium-based slurry comprises limestone (calcium carbonate; $CaCO_3$), but in other embodiments, a calcium-based slurry may comprise, e.g., hydrated lime (calcium hydroxide; $Ca(OH)_2$), which may be obtained by action of water on lime (calcium oxide; CaO), or a combination of limestone and hydrated lime. The acid-absorptive fluid is not limited to calcium-based slurries, and in other embodiments, other acid-absorptive fluids may be employed. For example, the acid-absorptive fluid may comprise a sodium-based or ammonia-based solution.

Tower 140 includes a recycle tank portion 142. After contact with the flue gas 122, the sprayed acid-absorptive fluid 162 is collected in the recycle tank portion 142. The acidic gases absorbed into the acid-absorptive fluid 162 react therein to form precipitates that can be collected for disposal or recycling. For example, in a flue gas desulfurization process using an acid-absorptive fluid including a calcium-based slurry, one reaction precipitate is gypsum ($CaSO_4$), which may be removed from apparatus 100 at one outlet (not shown).

Still referring to FIG. 1, recycle tank portion 142 includes an optional overflow drain 144 which helps limit the average height of acid-absorptive fluid in the tank. The recycle tank portion 142 may also include one or more agitators 146. The agitators 146 mix the acid-absorptive fluid to maintain the alkali and solid precipitates in suspension, and also to help disburse the air throughout the acid-absorptive fluid 162.

After being scrubbed by the acid-absorptive fluid 162 sprayed from the fluid injector 160, the flue gas 122 is permitted to escape to the atmosphere through a mist eliminator 148 at an upper end of the tower 140.

Apparatus 100 also includes a circulation system 190 for transporting acid-absorptive fluid 162 from recycle tank portion 142 to fluid injector 160. As shown in FIG. 1, in one embodiment, circulation system 190 includes a pump 192 and piping 194. However, circulation system 190 is not limited in this regard and it is contemplated that the circulation system may have other components not shown in FIG. 1.

Still referring to FIG. 1, apparatus 100 includes includes an aerator 150. At least a portion of the aerator 150 is positioned in the recycle tank portion 142. The aerator 150 has at least one opening 152 (shown in FIGS. 2-5) for introduction of an oxygen-containing gas 154 into the fluid. Oxygen-containing gas 154 is introduced into the acid-absorptive fluid 162 in the recycle tank portion 142 by the aerator 150 to oxygenate the acid-absorptive fluid with oxygen-containing bubbles 152a, so that absorbed acidic gases react to form solid precipitates that can be safely recycled or disposed of at an outlet (not shown), such as gypsum in the case of a calcium-based slurry. Oxygen-containing gas 154 introduced into the acid-absorptive fluid 162 reduces the density of the acid-absorptive fluid, i.e., the added air causes the acid-absorptive fluid to expand. Oxygen-containing gas 154 may be any oxygen-containing gas, including, but not limited to $O_2$, air, and the like.

Figure 4:
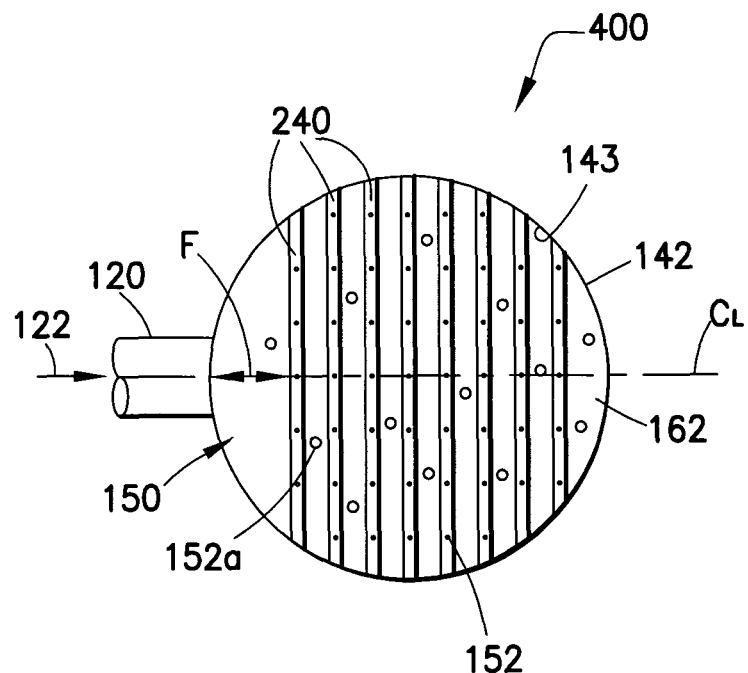
FIG. 4 is a schematic cross-sectional view of another embodiment along line A-A of the tank in FIG. 1
Figure 5:
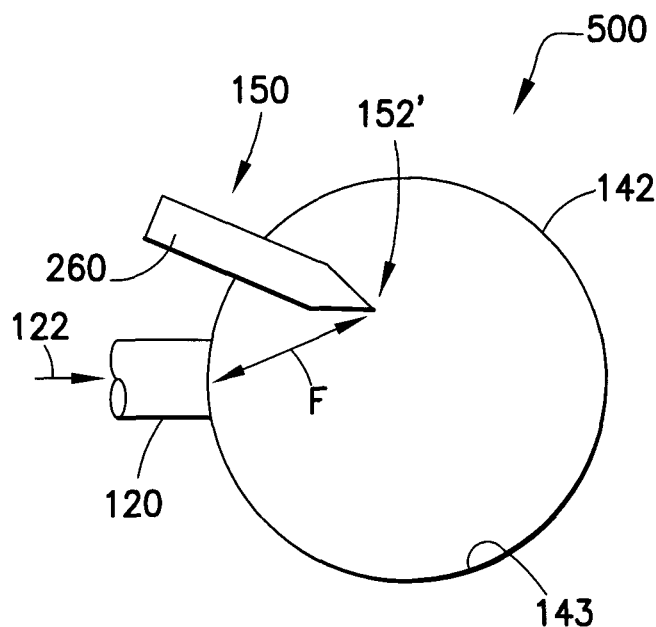
FIG. 5 is a schematic cross-sectional view of an aerator in a tank of a flue gas scrubbing apparatus in accordance with another embodiment.

Various types of aerators are known in the art, e.g., air lances, spargers and eductors (jet pumps), and any of these may be employed for aerator 150. In one embodiment, as shown in FIGS. 2-4, aerator 150 is a sparger having at least one sparger pipe 240. In another embodiment, as shown in FIG. 5, aerator 150 is an air lance 260.

Referring back to FIG. 1, the inlet 120 opens into the tower 140 at a clearance distance C above the level of the acid-absorptive fluid 162. Clearance distance C is maintained when acid-absorptive fluid 162 does not swell outside a volume corresponding to a height Y in recycle tank portion 142. Typically, the acid-absorptive fluid 162 does not swell out of volume of height Y when the acid-absorptive fluid 162 is static, e.g., the acid-absorptive fluid is not aerated. A swell S of acid-absorptive fluid 162 may occur in the recycle tank portion 142, thereby expanding the volume of acid-absorptive fluid 162 to a volume corresponding to a height X.

In some prior art flue gas scrubbing apparatuses, an oxygen containing gas is introduced into an acid-absorptive fluid at a point in a tank directly beneath the inlet, causing the level of acid-absorptive fluid near the inlet to rise in a localized swell and necessitating that a clearance distance be significantly above the level of the non-aerated acid-absorptive fluid to prevent the flow of expanded acid-absorptive fluid into the inlet. The increased clearance distance increases an overall height H of the flue gas scrubbing apparatus, adding significant expense to the flue gas scrubbing apparatus, especially when additional corrosion-resistant alloy construction material is used. In some prior art apparatuses, the necessary increase in the clearance distance is about 6 to 8% of the static depth of the acid-absorptive fluid (i.e., the depth of the fluid absent the injected air). In some cases, the necessary increase in the clearance distance may be one or two meters.

It is also known to provide a prior art flue gas scrubbing apparatus with a vertically disposed pipe in the tank (not shown), and to aerate the acid-absorptive fluid by releasing air into the pipe. The pipe acts like a baffle to obstruct the flow of a localized swell of expanded acid-absorptive fluid into the inlet duct opening, thus avoiding or at least reducing the need for a large clearance between the inlet duct opening and the surface of the acid-absorptive fluid to prevent such flow into the inlet duct opening. However, providing a vertically disposed pipe adds significant cost to the scrubber. In other prior art apparatuses, acid-absorptive fluid is removed from the tank that collects sprayed acid-absorptive fluid from the fluid injector (the "spray collection tank") to be aerated in a separate aeration tank, and the aerated acid-absorptive fluid is then recirculated to the spray collection tank. However, providing a separate aeration tank adds significant cost and size to the flue gas scrubbing apparatus.

In general, and as shown in FIG. 1, the aerator 150 is configured to introduce oxygen-containing gas 154 to the acid-absorptive fluid 162 through at least one opening 152 positioned at a predetermined radial distance F from the flue gas inlet 120. In one embodiment, as shown in FIG. 1, the predetermined radial distance F is equal to a percentage of the diameter D of the recycle tank portion 142. As shown in FIG. 1, the recycle tank portion 142 has a diameter D and centerline $C_L$ (shown in FIG. 2). While not illustrated, it is contemplated that the recycle tank portion 142 (as well as tower 140) may have a cross section of another shape, such as a square, rectangle, or other shape, and the diameter of such a tank would be equivalent to the width of the tower.

In one embodiment, the predetermined radial distance F is equal to about 15% (e.g., 15±5%) of the diameter D of the recycle tank portion 142. More generally, the predetermined radial distance F may be equal to at least about 10% or more of the diameter D, for example, at least about 15% or more of the diameter D or, in another embodiment, about 20% or more of the diameter D.

The introduction of the oxygen-containing gas 154 outside the predetermined radial distance F reduces or eliminates any swell S of the acid-absorptive fluid 162 located directly beneath the inlet 120, e.g., within the predetermined radial distance F. Accordingly, an area or zone adjacent to the inlet 120 is substantially static. Predetermined radial distance F provides a distance that is sufficient to allow a localized swell S of expanded acid-absorptive fluid, which may occur above where the oxygen-containing gas 154 is released, to dissipate before the swell S reaches the inlet 120. Accordingly, creation of a localized swell of the acid-absorptive fluid 162 proximate to the inlet 120 is reduced or avoided, and there is no need for a pipe or other baffle structure between the aerator 150 and the inlet 120 to inhibit such a swell from flowing into the inlet.

The tank 140 is sized to provide desired residence times of solids and liquids therein. Therefore, for a given diameter, a fixed volume of fluid is present in the tank. Providing a static zone of acid-absorptive fluid 162 as described herein allows the inlet 120 to be positioned lower than it would otherwise need to be for a specified volume of acid-absorptive fluid 162 in a tank 140 of given diameter. Consequently, the height H of the flue gas scrubbing apparatus 100 is also smaller than it would otherwise be, and there is no need for aerating the acid-absorptive fluid outside of the tank 140, resulting in considerable savings.

Referring now to FIGS. 2-4, the aerator 150 is a sparger having at least one sparger pipes 240. As shown in FIG. 2, which is a cross-sectional view of tower 140 taken across line A-A in FIG. 1, sparger pipes 240 have at least one opening 152 disposed along a length of the sparger pipe 240 for introduction of the oxygen-containing gas 154 into the fluid 162. The sparger pipes 240 depicted in FIG. 2 span the recycle tank portion 142 from one point on the interior wall 143 to another point on the opposing interior wall in a direction parallel to the centerline $C_L$.

Sparger pipes 240 are aligned within the recycle tank portion 142 in a direction of a flow of the flue gas 122 from the inlet 120 and extend across the recycle tank portion 142 in parallel relation to each other and to a centerline $C_L$ of the recycle tank portion 142. The sparger pipes 240 are mounted on a support grid (not shown) that is constructed in the recycle tank portion 142, as is known in the art. Each sparger pipe 240 has a mouth into which air is pumped and a plurality of openings 152 along a length of the sparger pipe 240.

The sparger pipes 240 are configured so that at least one opening 152 is positioned to release the oxygen-containing gas 154 at least at a distance greater than or equal to the predetermined radial distance F from the flue gas inlet 120. In one embodiment, the sparger pipes 240 are manufactured so that no openings 152 are present on the sparger pipes 240 within the predetermined radial distance F. Alternatively, sparger pipes 240 that have openings 152 along their entire lengths can be modified by plugging the openings 152 or otherwise obstructing the openings 152 within the predetermined radial distance F. Accordingly, an existing flue gas scrubbing system can be modified as described herein without the need for replacing the entire flue gas scrubbing apparatus 100.

In another embodiment, as shown in FIG. 3, which is a cross-sectional view of the tower 140 across line A-A, a flue gas scrubbing apparatus 200 having the inlet 120 at one side of a tank 140, and the aerator 150 being a sparger having at least one sparger pipe 240, which enter the tank from the opposite side of the inlet 120 and extend, mutually parallel, towards the inlet. The sparger pipes 240 are parallel to the flow of flue gas 122. The sparger pipes 240 may have openings 152 along any portion of their length within the recycle tank portion 142, or along their entire lengths within the recycle tank portion 142, but the sparger pipes are limited in length. For example, as shown in FIG. 3, the sparger pipes 240 span the interior and terminate at a line 147. In one embodiment, the line 147 runs perpendicular to the centerline $C_L$ and, at the centerline $C_L$, is the predetermined radial distance F from the inlet 120.

In one embodiment, the sparger pipes 240 are positioned so openings 152 release the oxygen-containing gas 154 at least at a distance greater than or equal to predetermined radial distance F from the flue gas inlet 120. In one embodiment, the line 147 encounters the centerline $C_L$ at a distance of about 80% of the diameter D of recycle tank portion 142. In another embodiment, the line 147 encounters the centerline $C_L$ at a distance of about 85% of the diameter D of recycle tank portion 142. In yet another embodiment, the line 147 encounters the centerline $C_L$ at a distance of about 90% of the diameter D of the recycle tank portion 142.

While FIG. 3 illustrates all sparger pipes 240 spanning the recycle tank portion 142 to the same line 147, as shown in apparatus 300 of FIG. 3a, it is contemplated that a portion of sparger pipes 240 present in the recycle tank portion 142 may span a longer distance across the recycle tank portion 142 in a direction parallel to centerline $C_L$ of the recycle tank portion 142, e.g., all sparger pipes 240 start at a position against interior wall 143 and span in a direction parallel to the centerline $C_L$ with a portion of the sparger pipes 240 ending at a position against the opposing interior wall and another portion of the sparger pipes 240 ending at a point within the recycle tank portion 142 where the pipes encounter an arc 149. However, all the sparger pipes 240 present in the recycle tank portion 142 are positioned so openings 222 release the oxygen-containing gas 224 at least at a distance that is greater than or equal to a predetermined radial distance F from the flue gas inlet 120.

In another embodiment, as shown in FIG. 4, which is a cross-sectional view of the tower 140 across line A-A, a flue gas scrubbing apparatus 400 having the inlet 120 has sparger pipes 240 arranged perpendicular to the flow of flue gas 122 and centerline $C_L$. The sparger pipes 240 may have openings 152 along any portion of their length within the recycle tank portion 142, or along their entire lengths within the recycle tank portion 142. Regardless of whether the openings 152 are present on only a portion of the sparger pipes 240 or the entire length of the sparger pipes, the sparger pipes 240 are positioned so openings 152 release the oxygen-containing gas 154 at least at a distance greater than or equal to predetermined radial distance F from the flue gas inlet 120.

In still another embodiment, the aerator 220 in a flue gas scrubbing apparatus 500 shown in FIG. 5, which is a cross-sectional view of the tower 140 across line A-A, is an air lance 260 that ejects air at an opening 152'. Opening 152' is positioned to release the oxygen-containing gas 154 at least at a distance greater than or equal to predetermined radial distance F from the flue gas inlet 120.

Newly constructed flue gas scrubbers can incorporate aerators as described herein, and/or aerators in prior art scrubbers can be modified to conform to the teachings provided herein.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of scrubbing flue gas comprising:
introducing flue gas comprising an acidic gas through an inlet into a tower;
spraying an acid-absorptive fluid into the tower such that the acid-absorptive fluid contacts the flue gas;
accumulating the acid-absorptive fluid in a recycle tank portion of the tower; and
introducing an oxygen-containing gas into the acid-absorptive fluid in the recycle tank portion of the tower,
wherein the oxygen-containing gas is introduced through at least one opening of an aerator, each of the at least one opening being positioned to release the oxygen-containing gas at least at a distance greater than or equal to a predetermined radial distance F from the flue gas inlet, the predetermined radial distance F being equal to at least 10% of a diameter D of the recycle tank portion of the tower.

2. A method according to claim 1, wherein the aerator includes at least one sparger pipe and the at least one opening is disposed along a length of the sparger pipe.

3. A method according to claim 2, further comprising positioning the at least one sparger pipe parallel to the flow of flue gas from the inlet.

4. A method according to claim 2, further comprising position the at least one sparger pipe parallel to the flow of flue gas from the inlet.

5. A method according to claim 1, wherein the predetermined radial distance F is at least 15% of the diameter D of the recycle tank portion of the tower.

6. A method according to claim 1, wherein the predetermined distance F is at least 20% of the diameter D of the recycle tank portion of the tower.

* * * * *